US012663553B1

(12) United States Patent
Liu et al.

(10) Patent No.: US 12,663,553 B1
(45) Date of Patent: Jun. 23, 2026

(54) EXPLORING A SUBSURFACE FORMATION

(71) Applicant: Saudi Arabian Oil Company, Dhahran (SA)

(72) Inventors: Yujin Liu, Beijing (CN); Thierry-Laurent Dominique Tonellot, Montferrier-sur-lez (FR); Yi He, Beijing (CN); Young Seo Kim, Dhahran (SA); Hussain J. Salim, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/205,167

(22) Filed: May 12, 2025

(51) Int. Cl.
| | |
|---|---|
| *G01V 1/34* | (2006.01) |
| *E21B 49/00* | (2006.01) |
| *G01V 1/28* | (2006.01) |
| *G01V 1/30* | (2006.01) |

(52) U.S. Cl.
CPC .............. *G01V 1/345* (2013.01); *E21B 49/00* (2013.01); *G01V 1/282* (2013.01); *G01V 1/303* (2013.01); *E21B 2200/20* (2020.05)

(58) Field of Classification Search
CPC ........ G01V 1/345; G01V 1/282; E21B 49/00; E21B 2200/20
See application file for complete search history.

(56) References Cited

U.S. PATENT DOCUMENTS

| | | | |
|---|---|---|---|
| 2021/0018638 A1* | 1/2021 | Goteti | .................... G01V 1/303 |
| 2024/0184007 A1 | 6/2024 | He et al. | |
| 2024/0288599 A1* | 8/2024 | Alyousuf | ............. G01V 11/002 |
| 2024/0302555 A1* | 9/2024 | Liu | ......................... G01V 1/345 |
| 2025/0231311 A1* | 7/2025 | Sun | ........................... G01V 1/48 |

OTHER PUBLICATIONS

Alkhalifah, "Efficient traveltime compression for 3D prestack Kirchhoff migration," Geophysical Prospecting, 2011, 59(1):1-9, 9 pages.
Etgen et al., "An overview of depth imaging in exploration geophysics," Geophysics, Nov.-Dec. 2009, 74(6), WCA5-WCA17, 13 pages.

(Continued)

*Primary Examiner* — Yong-Suk (Philip) Ro
(74) *Attorney, Agent, or Firm* — Fish & Richardson P.C.

(57) ABSTRACT

Methods for mapping a subsurface formation can include: generating a velocity model representing the subsurface formation based on the seismic data; determining an upper bound for traveltime within the velocity model from a seismic source; and generating a seismic image of the subsurface formation by migrating the seismic data using Kirchhoff depth migration, where traveltime is calculated through ray tracing, and the maximum traveltime determines the stopping point for ray tracing. Determining an upper bound for traveltime within the velocity model from a seismic source can include: converting the velocity model into a slowness model; integrating slowness along straight paths from the seismic source to boundary points of the slowness model to generate traveltime values; and determining an upper bound of traveltime for seismic rays traveling within the velocity model by selecting a maximum traveltime value from the straight paths.

7 Claims, 13 Drawing Sheets

(56) References Cited

OTHER PUBLICATIONS

Gajewski et al., "Amplitude preserving Kirchhoff migration: A traveltime based strategy," Institute of Geophysics, University of Hamburg, 46(2):193-211, 15 pages.

O'Brien et al., "Investigating a time-shift extended imaging condition in a Kirchhoff pre-stack depth migration algorithm," Geophysical Prospecting, Apr. 2018, 66(4):688-706, 19 pages.

O'Brien et al., "Pre-stack Kirchhoff depth migration local space-shift imaging condition: synthetic and data examples," Geophysical Prospecting, May 2019, 67(5):1184-1200, 17 pages.

Rastogi et al., "An efficient parallel algorithm: Poststack and prestack Kirchhoff 3D depth migration using flexi-depth iterations," Computers & Geosciences, Mar. 2015, 8 pages.

* cited by examiner

250

210 Generate seismic data

212 Generate velocity model based, at least in part, on seismic data

252 Estimate maximum travel time in velocity model

254 Perform ray tracing to generate traveltime tables

220 Generate seismic image

222 Perform field activities based on seismic image

1000

1002

EXPLORING A SUBSURFACE FORMATION

TECHNICAL FIELD

This specification generally relates to exploring a subsurface formation, particularly including seismic mapping of the subsurface formation.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications such as, for example, identification pf potential petroleum reservoirs. Seismic surveys are conducted by using a controlled seismic source (for example, Vibroseis or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources such as, for example, borehole logging, gravity surveys, and magnetic surveys.

One approach to this analysis is based on tracing rays and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This specification describes an approach to exploring a subsurface formation, particularly including seismic mapping of the subsurface formation. After a seismic survey is performed, the resulting seismic data provides the basis for generating a seismic map used to guide field activities (e.g., drilling exploration and production wells). Seismic imaging and velocity model building requires calculating traveltime from a shot to a point within the model. The traveltime can be calculated by ray tracing which is based in part on the maximum traveltime for sound waves within the subsurface formation. This approach is based on a computationally efficient approximation of the maximum traveltime.

This approach estimates a maximum traveltime using a hypothetical direct ray path rather than tracing actual ray paths. In contrast to methods which estimate maximum traveltime using ray tracing with a limited number of coarsely sampled emergent angles, this approach can improve computational efficiency. Despite requiring only a few rays to be traced, these methods still require substantial computational costs.

This approach also systematically evaluates all boundary points. By evaluating all of the boundary points, this approach provides a calculated upper bound of travel time which is greater than the traveltime at any other grid point within the model as it encompasses all grid points in its estimation. In contrast, the coarse sampling of emergent angles by ray tracing approaches fails to account for the model complexity, leading to potential underestimation of the maximum travel time. In addition, this approach adeptly handles topography complexity and subsurface heterogeneity by calculating travel time for each line segment, offering a comprehensive solution to the challenges presented by complex geological conditions.

The current approach can one or more of the following advantages. This approach can provide an efficient and accurate estimation of the traveltime upper bound. This is significant because overestimations of maximum traveltime result in unwarranted computational costs, whereas underestimations compromise the accuracy of imaging. This approach can reduce the number of time steps required for ray tracing without sacrificing traveltime information necessary for seismic imaging.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes an approach to exploring a subsurface formation, particularly including seismic mapping of the subsurface formation. After a seismic survey is performed, the resulting seismic data provides the basis for generating a seismic map used to guide field activities (e.g., drilling exploration and production wells). Seismic imaging and velocity model building requires calculating traveltime from a shot to a point within the model. The traveltime can be calculated by ray tracing which is based in part on the maximum traveltime for sound waves within the subsurface formation. This approach is based on a computationally efficient approximation of the maximum traveltime. The maximum traveltime is significant because it can be used to limit the ray tracing iterations performed in updating velocity models of subsurface formations and generating seismic images of subsurface formations.

This approach estimates a maximum traveltime using a hypothetical direct ray path rather than tracing actual ray paths. In contrast to methods which estimate maximum traveltime using ray tracing with a limited number of coarsely sampled emergent angles, this approach can improve computational efficiency. Despite requiring only a few rays to be traced, these methods still require substantial computational costs.

This approach also systematically evaluates all boundary points. By evaluating all of the boundary points, this approach provides a calculated upper bound of travel time which is greater than the traveltime at any other grid point within the model as it encompasses all grid points in its estimation. In contrast, the coarse sampling of emergent angles by ray tracing approaches fails to account for the model complexity, leading to potential underestimation of the maximum travel time. In addition, this approach adeptly handles topography complexity and subsurface heterogeneity by calculating travel time for each line segment, offering a comprehensive solution to the challenges presented by complex geological conditions.

Figure 1:
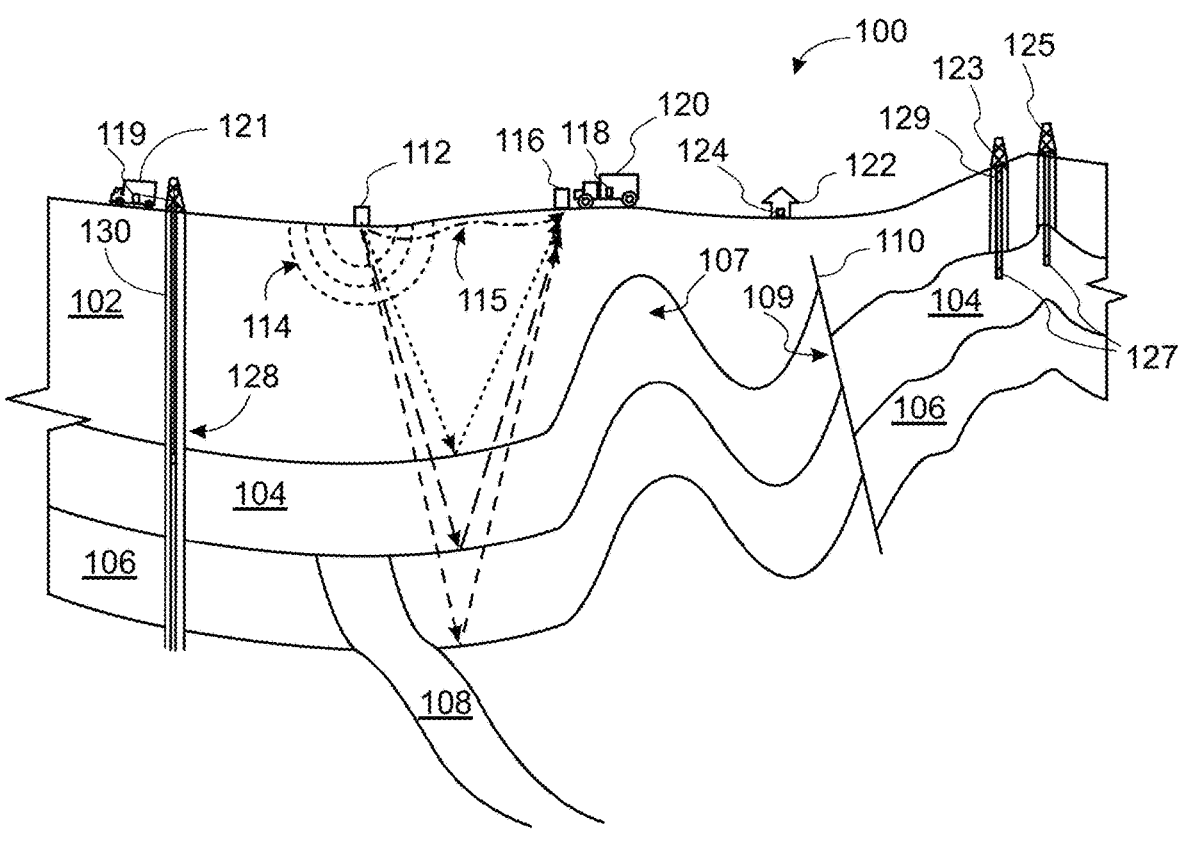
FIG. 1 is a schematic view illustrating hydrocarbon exploration and production activities is a subsurface formation.

FIG. 1 is a schematic view illustrating hydrocarbon exploration and production activities in a subsurface formation 100. These activities include conducting a seismic survey and mapping of the subsurface formation 100.

The subsurface formation 100 includes a layer of impermeable cap rocks 102 at the surface. Facies underlying the impermeable cap rocks 102 include layers 104, 106, and 108. A fault line 110 extends across the layer 104 and the layer 106.

Oil and gas tend to rise through permeable reservoir rock until further upward migration is blocked, for example, by the layer of impermeable cap rock 102. Seismic surveys attempt to identify locations where interaction between layers of the subsurface formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the surface.

The velocity of these seismic waves depends properties such as, for example, density, porosity, and fluid content of the medium through which the seismic waves are traveling. Different geologic bodies or layers in the earth are distinguishable because the layers have different properties and, thus, different characteristic seismic velocities. For example, in the subsurface formation 100, the velocity of seismic waves traveling through the subsurface formation 100 will be different in the sandstone layer 104, the limestone layer 106, and the sand layer 108. As the seismic waves 114 contact interfaces between geologic bodies or layers that have different velocities, the interface reflects some of the energy of the seismic wave and refracts part of the energy of the seismic wave. Such interfaces are sometimes referred to as horizons.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subsurface formation 100. Travel of the seismic waves can be represented by seismic rays which are lines perpendicular to the seismic wave front to indicate the propagation direction at that point on the wave front. The sensors 116 can be geophone-receivers that produce electrical output signals transmitted as input data, for example, to a computer 118 on a seismic control truck 120. Based on the input data, the computer 118 may generate a seismic data output such as, for example, a seismic two-way response time plot.

The seismic surface waves 115 travel more slowly than seismic body waves 114. Analysis of the time it takes seismic surface waves 115 to travel from source to sensor can provide information about near surface features.

In some embodiments, a wellbore 130 that has been drilled in the subsurface formation 100 is logged in a well logging operation 128. The wellbore 130 extends downhole from a wellhead 132. The wellbore 130 is a vertical wellbore but well logging can also be performed in other wellbores, for example, slanted or horizontal wellbores. In the well logging operation 128, the wellbore 130 penetrates through three layers 102, 104, and 106 of a subsurface formation 100. A control truck 121 lowers a logging tool 134 down the wellbore 130 on a wireline 136.

The logging tool 134 is string of one or more instruments with sensors operable to measure geophysical properties of the subsurface formation 100. For example, logging tools can include resistivity logs, borehole image logs, porosity logs, density logs, or sonic logs. As the logging tool 134 travels downhole, measurements of formations properties are recorded to generate a well log. In the illustrated operation, the data are recorded at the control truck 121 in real-time. Real-time data are recorded directly against measured cable depth. In some well-logging operations, the data is recorded at the logging tool 134 and downloaded later. In this approach, the downhole data and depth data are both recorded against time. The two data sets are then merged using the common time base to create an instrument response versus depth log.

In the well logging operation 128, the well logging is performed on a wellbore 110 that has already been drilled. In some operations, well logging is performed in the form of logging while drilling techniques. In these techniques, the sensors are integrated into the drill string and the measurements are made in real-time, during drilling rather than using sensors lowered into a well after drilling.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems that provide additional information about the subsurface formation. For example, the control center 122 can receive data from a computer 119 associated with a well logging unit 121.

The computer systems 124 can be located in a different location than the control center 122. Some computer systems are provided with functionality for manipulating and analyzing the data, such as performing seismic interpretation or borehole resistivity image log interpretation to identify geological surfaces in the subsurface formation or performing simulation, planning, and optimization of production operations of the wellsite systems.

The computer systems 124 in the control center 122 can be configured to analyze, model, control, optimize, or perform management tasks of field operations associated with development and production of resources such as oil and gas from the subsurface formation 100. For example, an injection well 123 and a production well 125 extend into layer 104 of the subsurface formation 100. Based on data gathered by the exploratory field operations, the computer systems 124 can generate models such as a reservoir model for portions of the subsurface formation 100. These models can simulate the effects of production field operations (e.g., injecting water or carbon dioxide through the injection well 123 to increase the production of hydrocarbons through the production well 125). The simulations can be used to plan and, in some instances, control field operations (e.g., the operation of pumps associated with the injection well 123 and the production well 125).

In some embodiments, results generated by the computer systems 124 may be displayed for user viewing using local or remote monitors or other display units. One approach to analyzing seismic data is to associate the data with portions of a seismic cube representing the subsurface formation 100. The seismic cube can also display results of the analysis of the seismic data associated with the seismic survey.

Figures 2A, 2B:
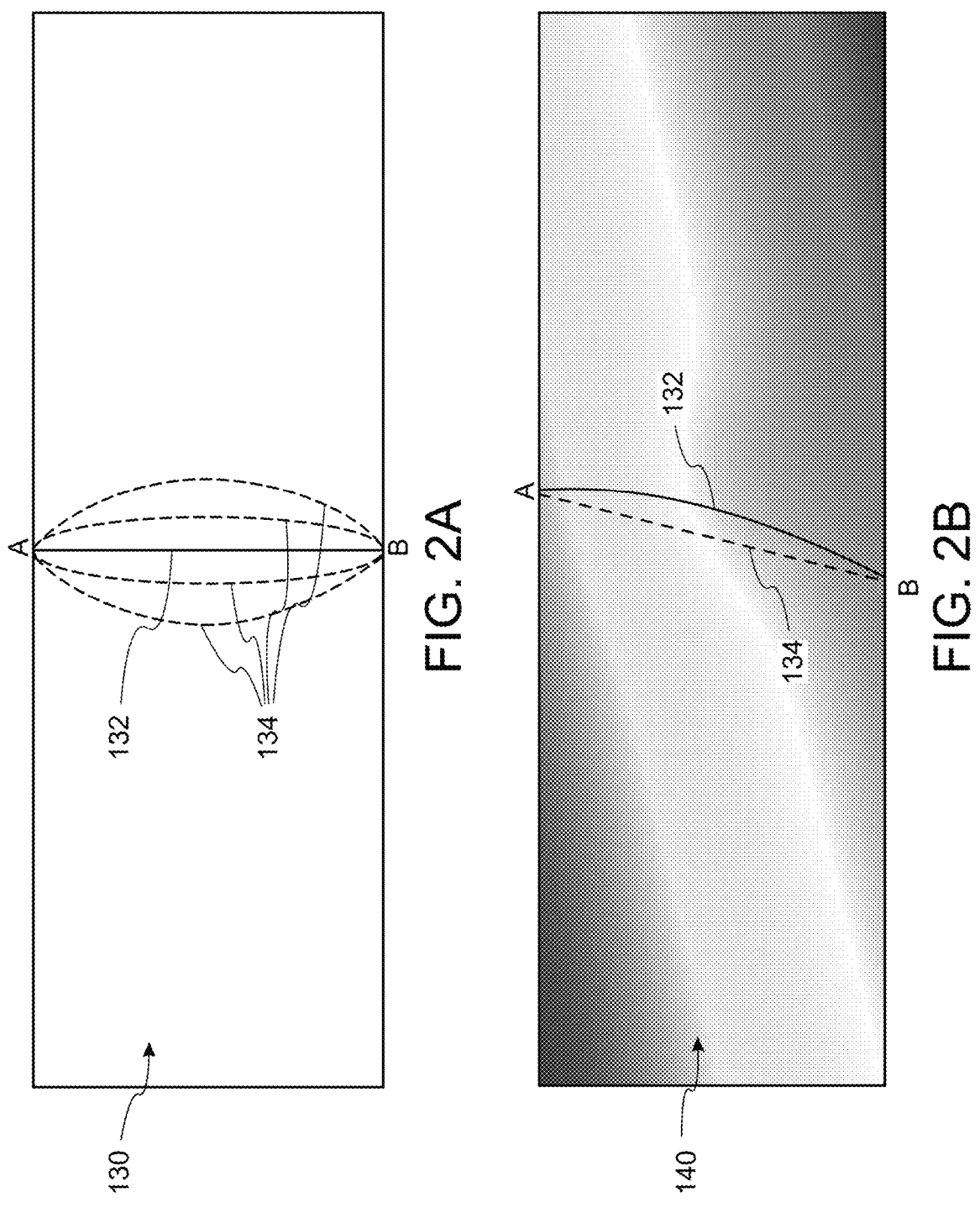
FIGS. 2A and 2B compare possible ray paths in a homogeneous velocity model (FIG. 2A) and an inhomogeneous velocity model (FIG. 2B).

FIGS. 2A and 2B compare possible ray paths in a homogeneous velocity model (FIG. 2A) and an inhomogeneous velocity model (FIG. 2B). The velocity model spans 16 km laterally and 4.06 km in depth. These figures illustrate Fermat's Principle, the underlying basis for the fast and accurate technique for estimating the traveltime upper bound for a model of a subsurface formation described in this specification. Fermat's Principle states that rays in a medium travel between two points along the path that requires the least traveltime.

FIG. 2A shows possible ray paths in a homogenous velocity model 130 with the actual path 132 that array will travel between point A and point B shown in a solid line and other possible paths 134 shown in dashed lines. In a homogeneous medium, the traveltime of each ray can be calculated as the distance traveled divided by the velocity at which the ray travels through the medium. As the velocity is constant inhomogeneous medium, the shortest distance path necessarily has the shortest traveltime and is also the actual path 132.

FIG. 2B shows possible ray paths in a inhomogeneous velocity model 140 with the actual path 132 that array will travel between point A and point B shown in a solid line and other possible paths 134 shown in dashed lines. Due to the spatial variations in velocity, the actual path 132 curves. In this case, the shortest distance path between point A and point B as a longer traveltime than the actual path 132.

As illustrated by these figures, the traveltime along the true path will not exceed that of a hypothetical straight path, regardless of the medium's complexity. However, using the straight line, shortest distance path as an upper bound of traveltime between two points may overestimate the upper bound of the traveltime when the velocity model exhibits significant variations, potentially leading to unnecessary computational expenses. Since the traveltime for a ray traveling from a source to a point on the boundary of a velocity model, selecting the maximum traveltime from traveltimes computed from the source to each individual boundary point provides a maximum traveltime for the whole model.

Figures 3A, 3B:
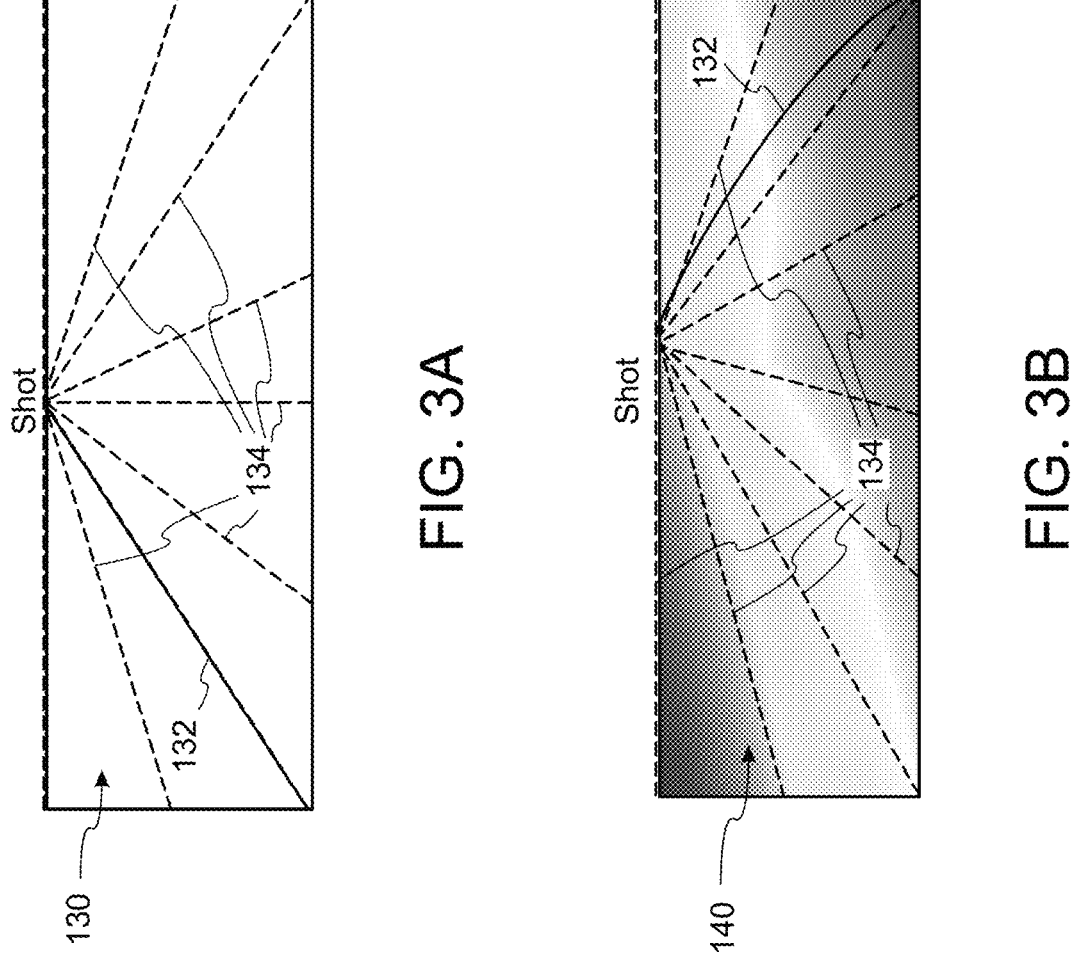
FIGS. 3A and 3B illustrate estimating a maximum traveltime for seismic rays in a homogeneous velocity model (FIG. 3A) and an inhomogeneous velocity model (FIG. 3B).

FIGS. 3A and 3B illustrate this approach for estimating a maximum traveltime for seismic rays in a homogeneous velocity model 130 (FIG. 3A) and an inhomogeneous velocity model 140 (FIG. 3B). This maximum traveltime facilitates efficient ray tracing in seismic imaging. Calculating the travel times along the hypothetic straight paths from the source to the boundaries and selecting the maximum value among these travel times provides a reliable approach to estimate the upper bound of the travel times within the given model.

Figures 4A, 4B:
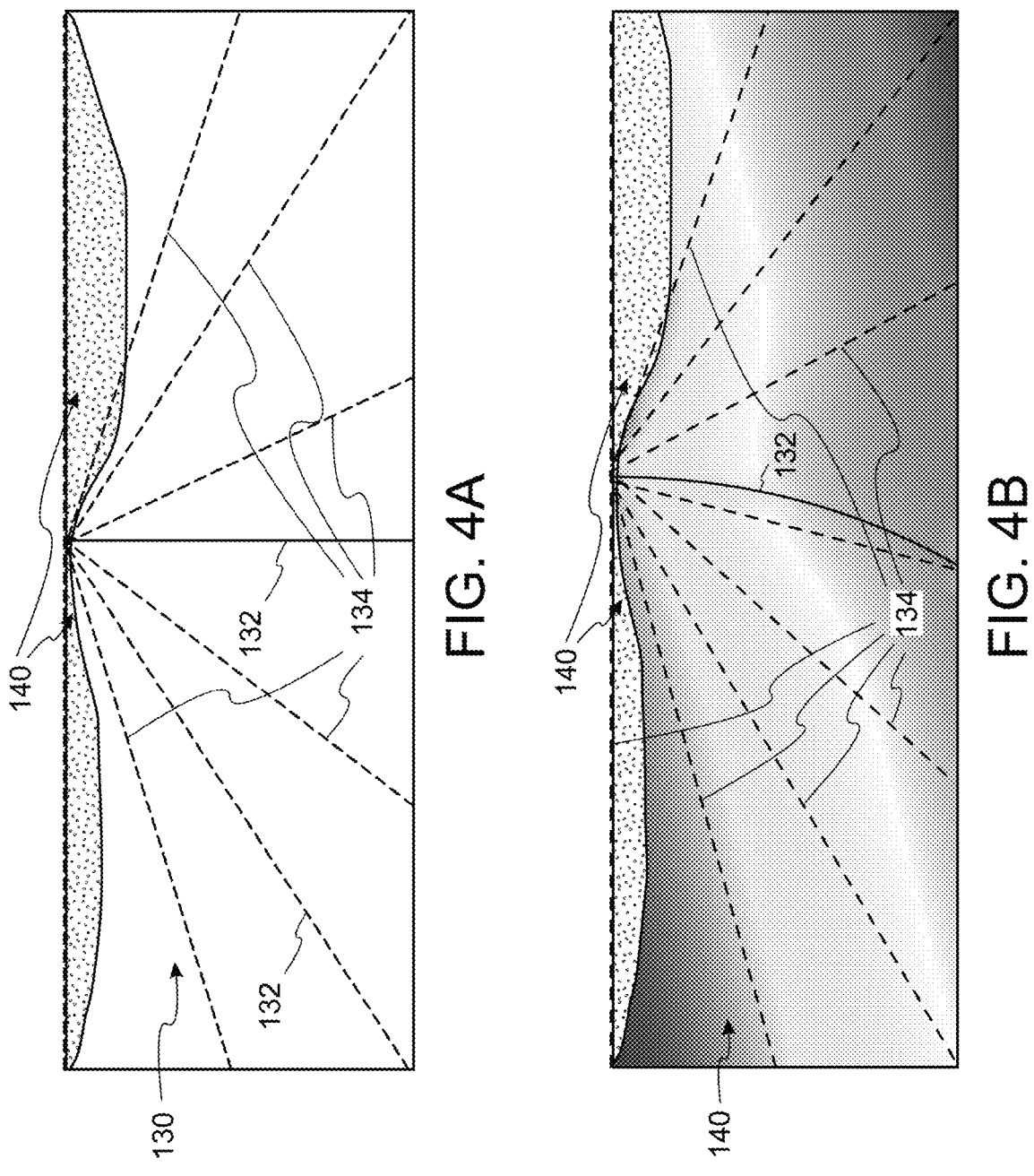
FIGS. 4A and 4B illustrate estimating a maximum traveltime for seismic rays in region with complex topography in a homogeneous velocity model (FIG. 4A) and an inhomogeneous velocity model (FIG. 4B).

FIGS. 4A and 4B illustrate estimating a maximum traveltime for seismic rays in region with complex topography in a homogeneous velocity model (FIG. 4A) and an inhomogeneous velocity model (FIG. 4B). The subsurface formation in the illustrated velocity models underlies bodies of water 140.

Figure 5:
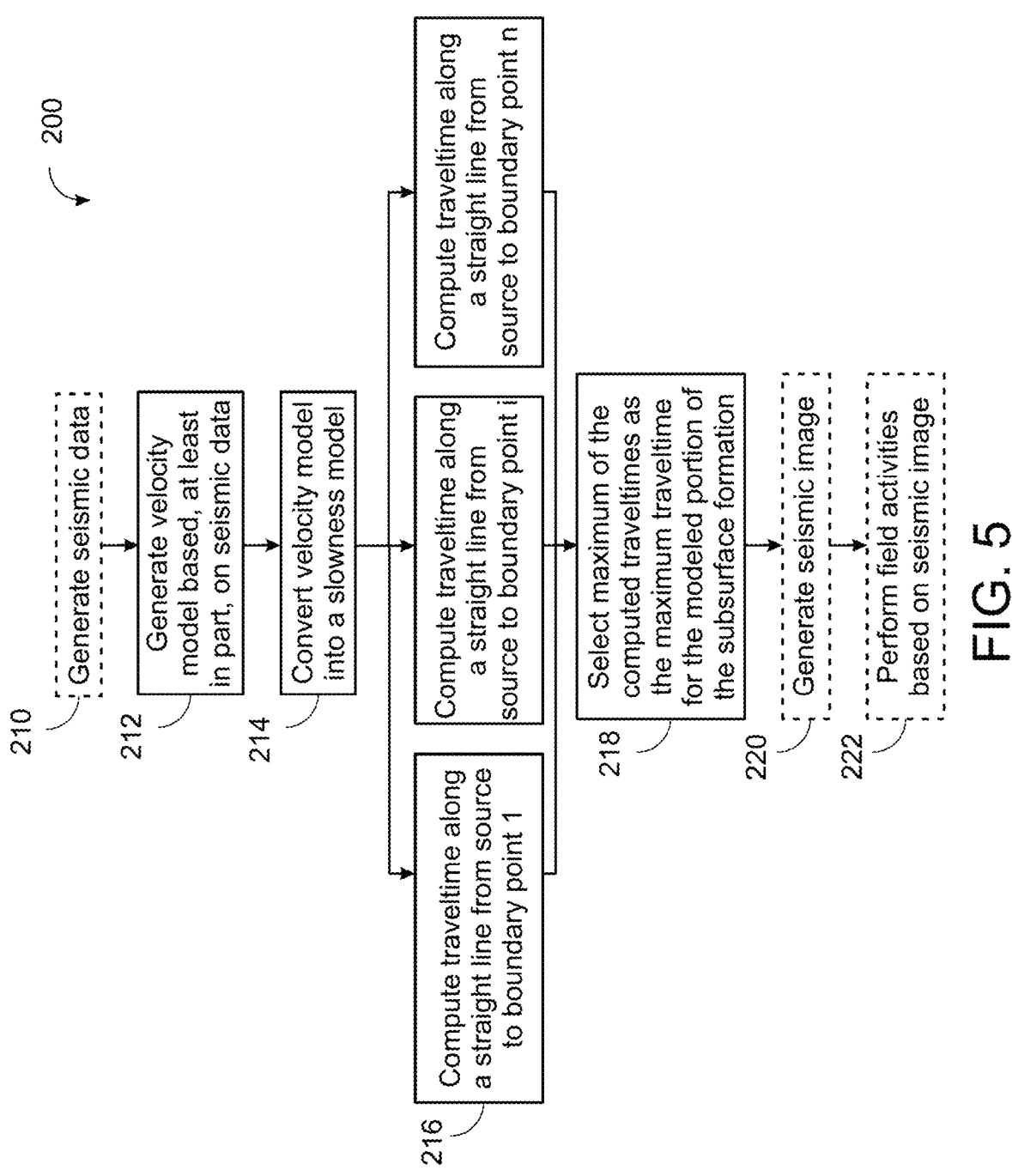
FIG. 5 is a flowchart of an approach to calculating the maximum traveltime for seismic waves in subsurface formation.

The approach described with reference to FIGS. 3A and 3B can be adapted to complicated topographies by simply filling the velocities between the topography and the datum plane at the highest elevation with a replacement velocity, such as acoustic velocity. This allows the proposed method to be extended straightforwardly by comparing the travel times from the shot to the boundary points along hypothetical straight paths. The method retains its efficiency in traveltime computation along these paths. Additionally, the method can be easily extended to multi-parameter models, such as elastic and anisotropic models, by simply adjusting the traveltime calculation for each segment, regardless of the subsurface model's parameterization FIG. 5 is a flowchart of a method 200 for calculating the maximum traveltime for seismic waves in subsurface formation. The maximum traveltime can be used to limit the ray tracing iterations performed in updating velocity models of subsurface formations and generating seismic images of subsurface formations.

The method 200 requires seismic data representing the subsurface formation. The seismic data can be generated (step 210) as part of the method 200. Alternatively or additionally, the seismic data can be seismic data previously generated, for example, through a seismic survey as described with respect to FIG. 1 and received by a processor for use in the method 200.

A velocity model is generated based, at least in part, on the seismic data (step 212). Typically, raw field seismic data from a seismic survey or surveys is preprocessed to remove noise, perform filtering, and correct for geometry. After preprocessing, the first arrivals from seismic traces are identified for near-surface velocity estimation. Semblance analysis is performed on seismic reflections to estimate stacking velocities which are then converted to interval velocities for deep structures.

The velocity model is converted into a slowness model (step 214). Slowness is the reciprocal of velocity with the traveltime of a wave being the distance that the wave travels times the slowness of the medium through which the wave is traveling. Accordingly, integrating the slowness model among a straight path from a seismic source to a point on the boundary of the model provides a maximum traveltime between the seismic source and the boundary point. Using the slowness model, the traveltime along a straight line between the seismic source and each point on the boundary of the model can be computed by integrating the slowness model along the straight line (step 216). As the slowness integration along various paths is independent, the integrations can be computed in parallel The model is discretized into rectangular grids, with boundary points located at the edges of the model. Therefore, the number of boundary points and their spacing are determined based on the given velocity model. The maximum of the computed travel times for these paths can be selected as the upper bound for seismic rays traveling within the model (step 218).

As discussed above, the upper bound of traveltime for seismic rays traveling within the model can be used in updating velocity model and/or and generating a seismic image of the subsurface formation (step 220). The seismic image can be generated by migrating seismic data to improve reflector positioning by correcting for wave propagation effects within the velocity model. Typically, calibration of the velocity model is performed using well data and tomography and quality control checks are performed to identify inconsistencies and velocity variations. The upper bound of traveltime for seismic rays traveling within the model is significant for migration methods that use ray-based traveltime computations (e.g., Kirchhoff Prestack Depth Migration).

In some cases, field activities are then performed based on the seismic image (step 222). For example, the field activities can include locating and drilling exploration and/or production wells in the subsurface formation. Beyond locating and drilling wells, other likely uses of the seismic images include:

- defining reservoir characteristics (e.g., seismic images help in understanding the properties of the subsurface reservoir, such as its size, shape, and the distribution of different rock types and fluids);
- mapping faults and fractures: (e.g., identifying and mapping faults and fractures is crucial for assessing the structural integrity of the subsurface and for planning and conducting safe drilling operations);
- building detailed geological models that can predict the behavior of the subsurface over time for use in planning and conducting extraction activities;
- monitoring changes in the subsurface over time for use in planning and conducting the injection of fluids in enhanced oil recovery (EOR) projects or $CO_2$ sequestration; and
- identifying potential geohazards, such as unstable slopes or areas prone to subsidence, to mitigate risks associated with subsurface activities.

Numerical tests indicate that using the proposed method can reduce the costs of ray tracing by 50% compared to the earlier methods based on maximal recording time of seismic data. For instance, in the SEAM Arid tests, the maximal recording time is 4.026 seconds, while the estimated maximum traveltime is less than 3.5 seconds. This results in approximately 50% reduction of ray tracing costs.

Figure 6:
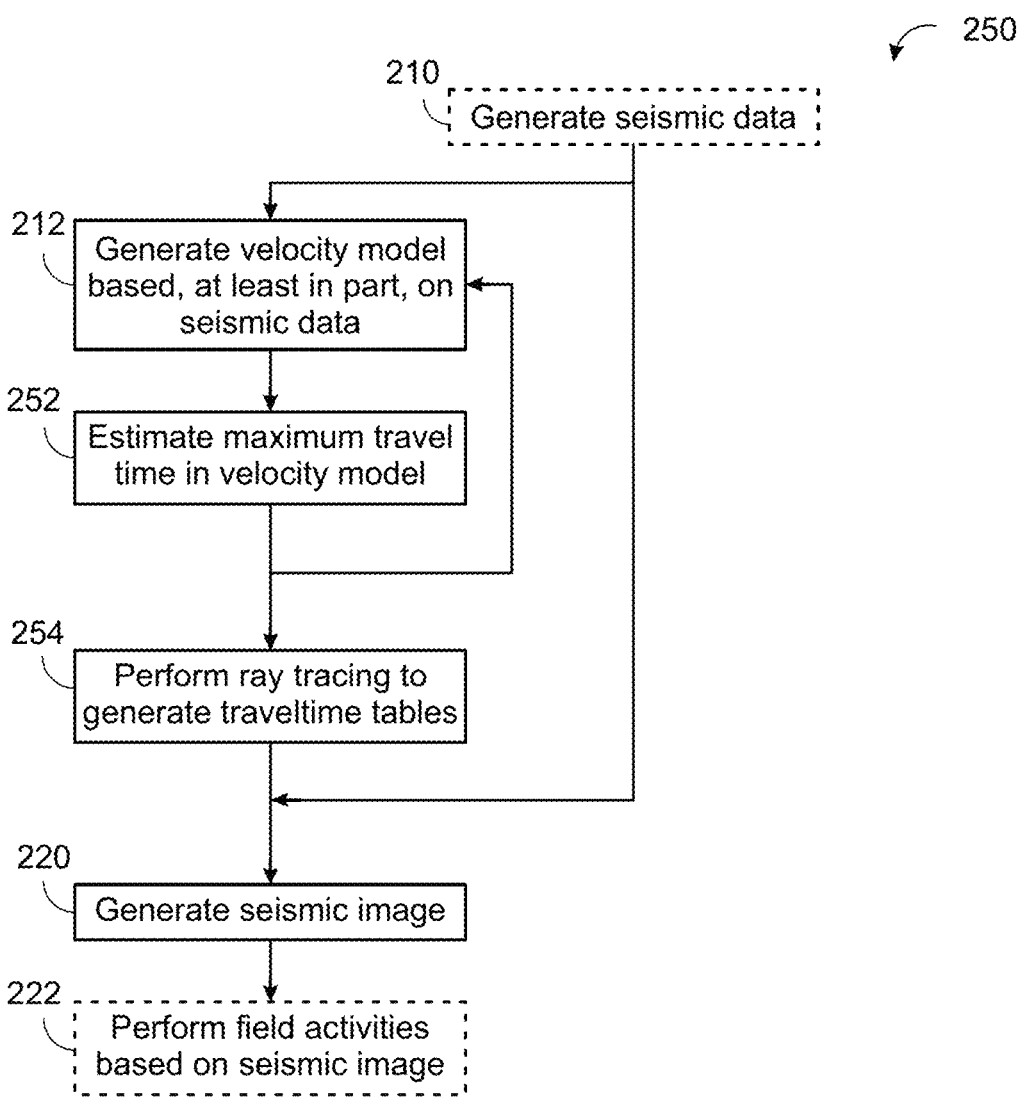
FIG. 6 a flowchart of an approach to using estimated maximum traveltime in generating seismic images.

FIG. 6 a flowchart of an approach 250 to using estimated maximum traveltime in generating seismic images. The method 250 uses seismic data to generate a velocity model as described with respect to FIG. 5. A maximum traveltime for the model estimated using the method 200 (step 525).

Ray tracing is then performed to generate traveltime tables (step 254). Each ray is defined by a starting position, an initial takeoff angle, and a step size for numerical integration. Each ray's trajectory is governed by the Eikonal equation, which describes the travel time of a wavefront through a velocity field (e.g., the velocity field represented by the velocity model). Cumulative travel time is computed as each ray propagates and travel times are stored at grid points to construct a travel-time table. When the computed ray paths do not directly land on grid points, interpolation is used to estimate travel times at desired locations.

The upper bound of traveltime for seismic rays traveling within the model is then used in generating a seismic image of the subsurface formation (step 220). The seismic image can be generated by migrating the velocity model to improve reflector positioning by correcting for wave propagation effects. Typically, calibration of the velocity model is performed using well data and tomography and quality control checks are performed to identify inconsistencies and velocity variations. The upper bound of traveltime for seismic rays traveling within the model is significant for migration methods that use ray-based traveltime computations (e.g., Kirchhoff Prestack Depth Migration). In some cases, field activities are then performed based on the seismic image (step 222).

Figure 7:
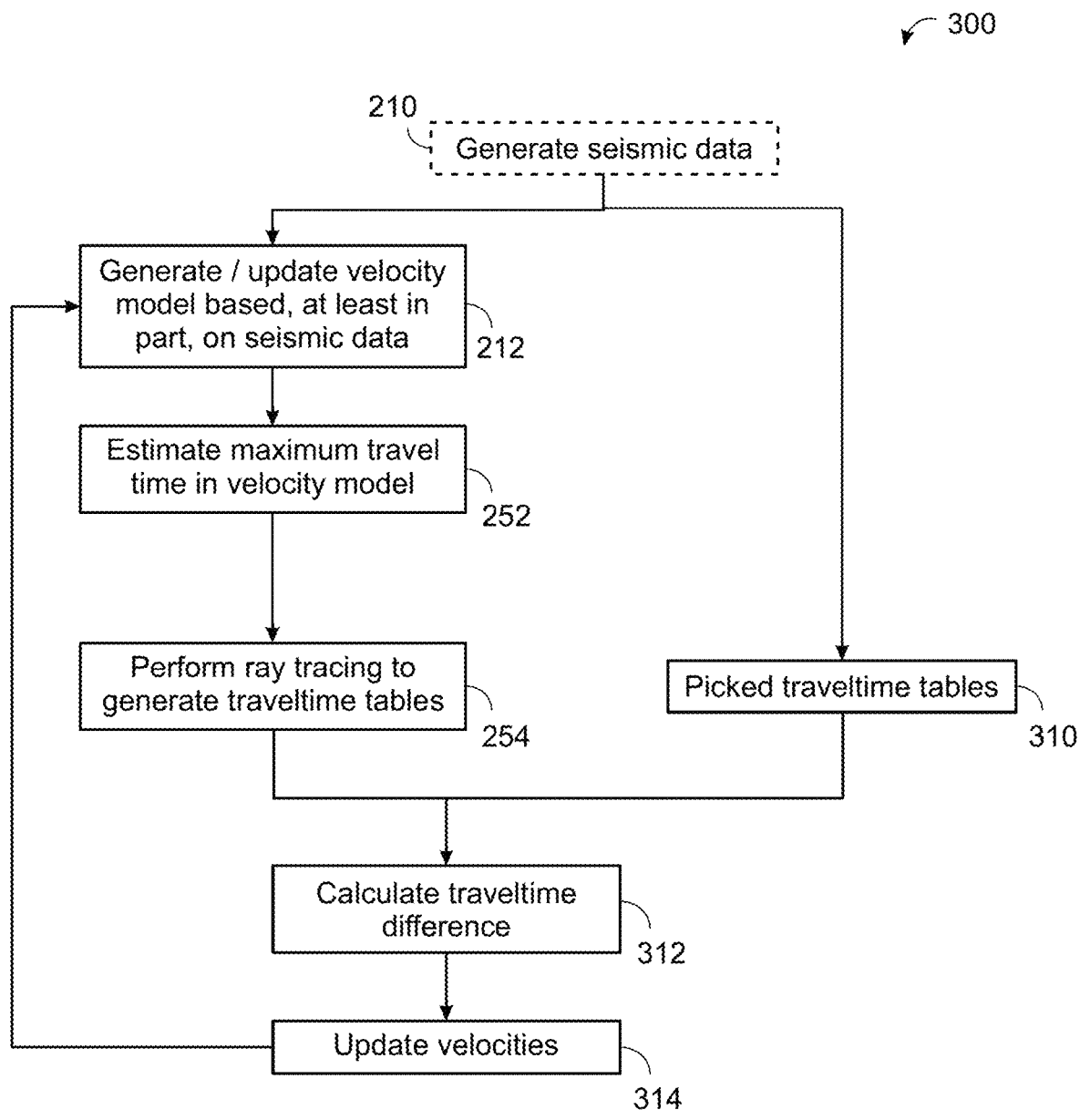
FIG. 7 a flowchart of an approach to using estimated maximum traveltime in building velocity models.

FIG. 7 is a flowchart of an approach 300 to using estimated maximum traveltime in updating velocity models. The method 300 uses seismic data to generate a velocity model as described with respect to FIG. 5. A maximum traveltime for the model estimated using the method 200 (step 525) and ray tracing is performed to generate traveltime tables (step 254).

Picked traveltime fields can be generated based on the seismic data (step 310). Traveltime tables can be picked manually, semi-automatically, or fully automatically based on the onsets of seismic waves. For example, advanced algorithms and machine learning techniques can automatically pick the onsets, significantly speeding up the process and reducing human error.

The differences between the estimated traveltime fields and the picked traveltime fields can be calculated (step 312) and a tomographic kernel can be generated based on these differences between the estimated traveltime fields and the picked traveltime fields. The tomographic kernel represents the sensitivity of the travel times to changes in the velocity model, helping to refine the model by highlighting areas where adjustments are needed. It can be generated by ray tracing or wave equation operators.

Velocities can be updates based on the tomographic kernel (step 314) and then incorporated into the velocity model. The tomographic kernel guides the direction for velocity updates. After determining an appropriate step size, the velocity model is adjusted to reduce the traveltime difference. This iterative process continues until the traveltime difference is minimized, providing a more accurate subsurface velocity model.

A prototype was implemented to test the approaches described above. The prototype was found to provide a fast and precise approach to estimate the maximum traveltime for seismic rays traveling within a given velocity model. By calculating the travel times along the straight paths from the source to the boundary points of the model and selecting the maximum value, an optimal traveltime upper bound is established for subsequent ray tracing steps. Numerical tests on several synthetic models have validated the method's capability to deliver accurate upper bound estimations of travel times.

These tests demonstrated a significant reduction in computational costs of ray tracing while ensuring accuracy in imaging processes. For example, numerical tests using the prototype indicate that using the proposed method can reduce the costs of ray tracing by 50% compared to the earlier methods based on maximal recording time of seismic data. For instance, in the SEAM Arid tests, the maximal recording time is 4.026 seconds, while the estimated maximum traveltime is less than 3.5 seconds. This results in approximately 50% reduction of ray tracing costs.

Figure 8A:
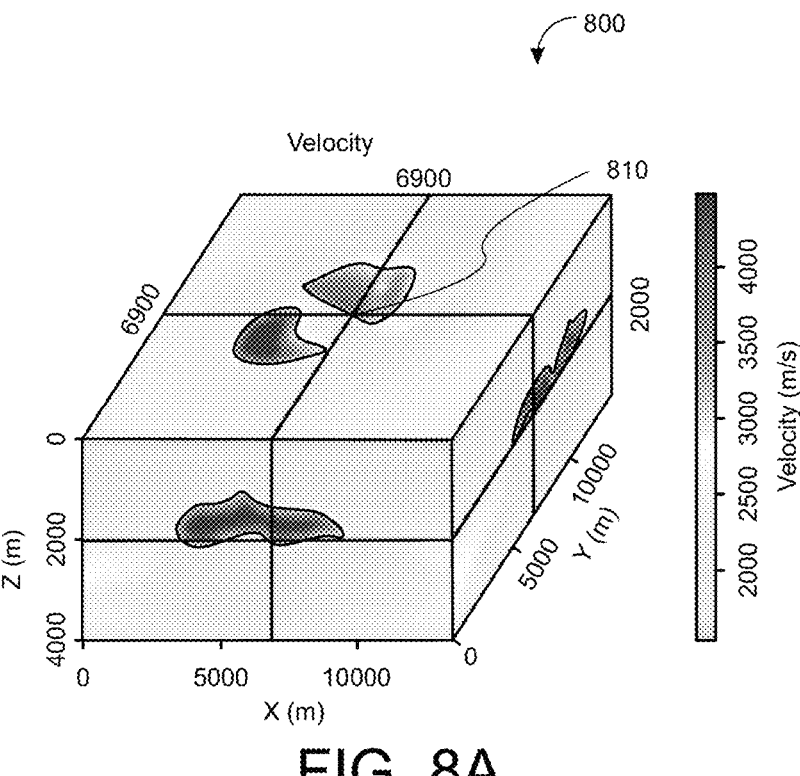
FIGS. 8A and 8B illustrate a velocity model (FIG. 8A) and a calculated traveltime field (FIG. 8B).
Figure 8B:
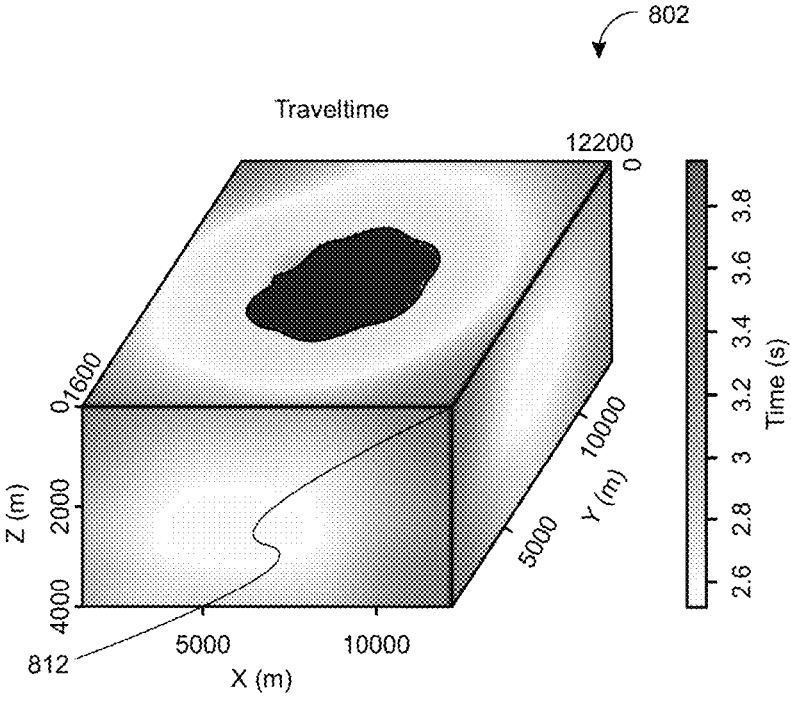

FIGS. 8A and 8B illustrate a velocity model 800 (FIG. 8A) and a calculated traveltime field 802 based on ray tracing (FIG. 8B) of the SEG/EAGE salt model used to validate the methods previously described. The SEG/EAGE Salt Model is a benchmark velocity model used in geophysics for testing seismic imaging and inversion techniques. It includes complex salt bodies, which create strong velocity contrasts that significantly affect wave propagation. A shot 810 located at the cross of blue lines on the model's surface. The true maximal traveltime is calculated by performing ray tracing and finding the maximum from the traveltime field 812 in FIG. 8B. While ray tracing can yield an accurate traveltime upper bound, it requires significant computational costs.

Figure 9:
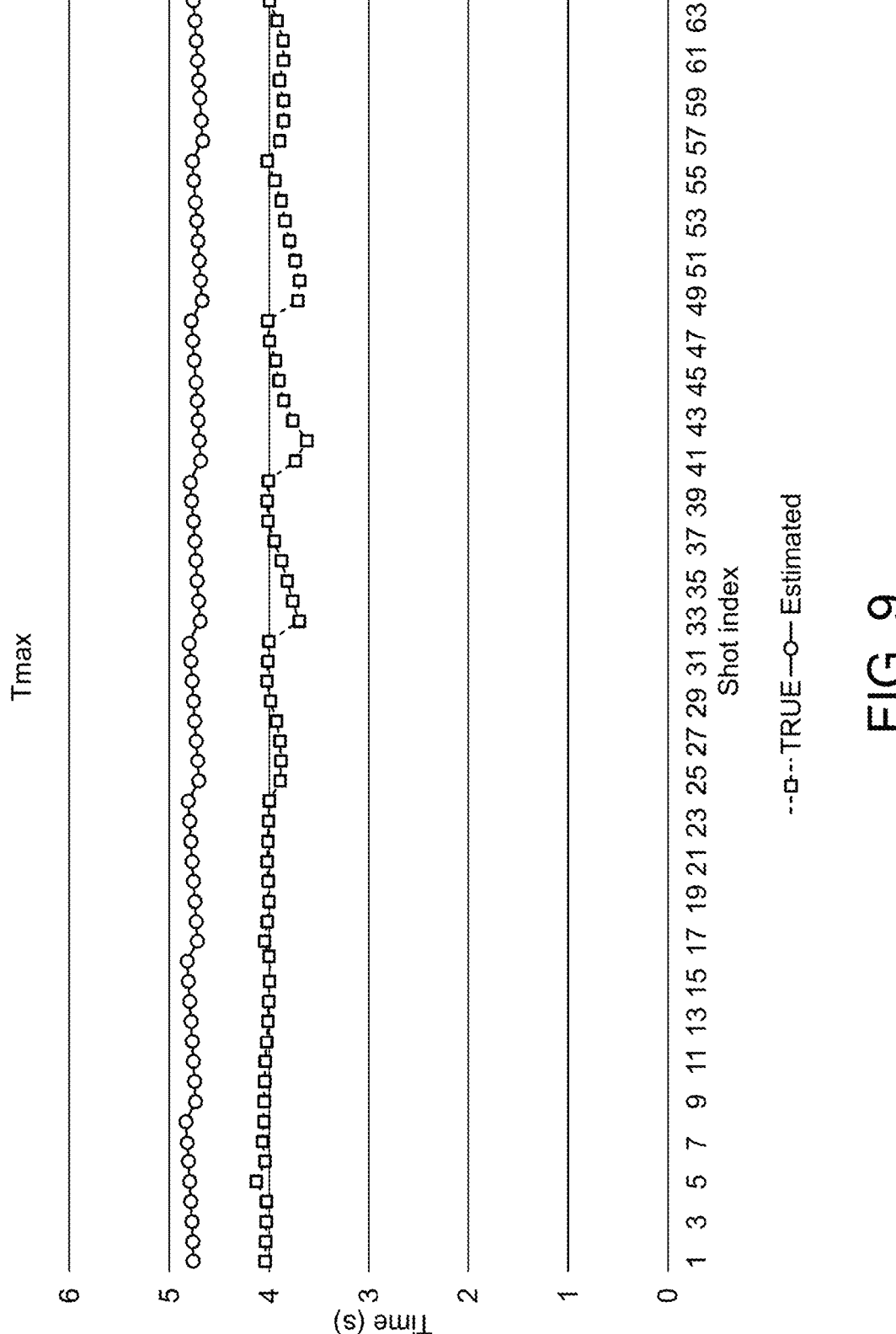
FIG. 9 compares true and estimated upper bounds of travel times for the subsurface region represented by the velocity model of FIG. 8A.

FIG. 9 compares true upper bounds (i.e., calculated using ray tracing) and estimated upper bounds (i.e., generated by the methods previously described) of travel times for the subsurface region represented by the velocity model of FIG. 8A. The chart provides a comparative analysis between the true and estimated traveltime upper bounds at various source locations that demonstrates the proposed methods' capacity to provide reasonable estimates with minimal computational overhead.

Figure 10A:
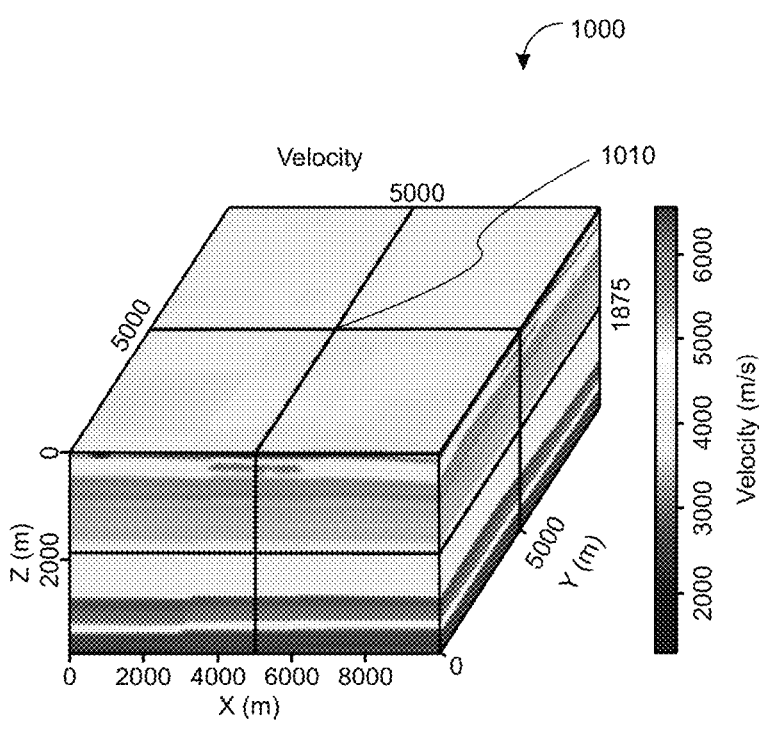
FIGS. 10A and 10B illustrate a velocity model (FIG. 10A) and a calculated traveltime field (FIG. 10B).
Figure 10B:
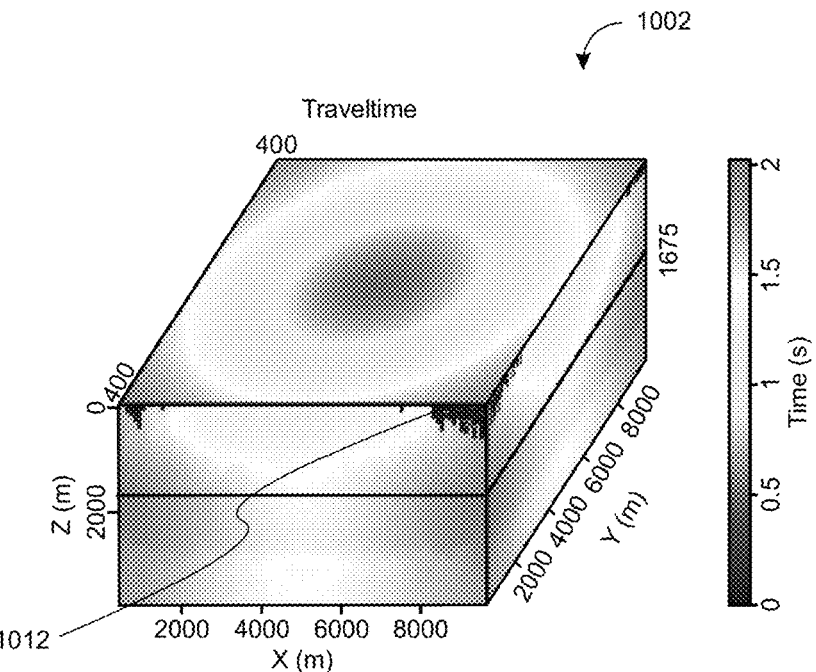

FIGS. 10A and 10B illustrate a velocity model 1000 (FIG. 10A) and a calculated traveltime field 1002 based on ray tracing (FIG. 10B) of the SEAM Arid model used to validate the methods previously described. The SEAM Arid model is a benchmark velocity model used in geophysics for testing seismic imaging and inversion techniques. It includes a complex subsurface formation that simulates desert environments near the surface. A shot 1010 located at the cross of blue lines on the model's surface. The true maximal traveltime is calculated by performing ray tracing and finding the maximum from the traveltime field 1012 in FIG. 10B. While ray tracing can yield an accurate traveltime upper bound, it requires significant computational costs.

Figure 11:
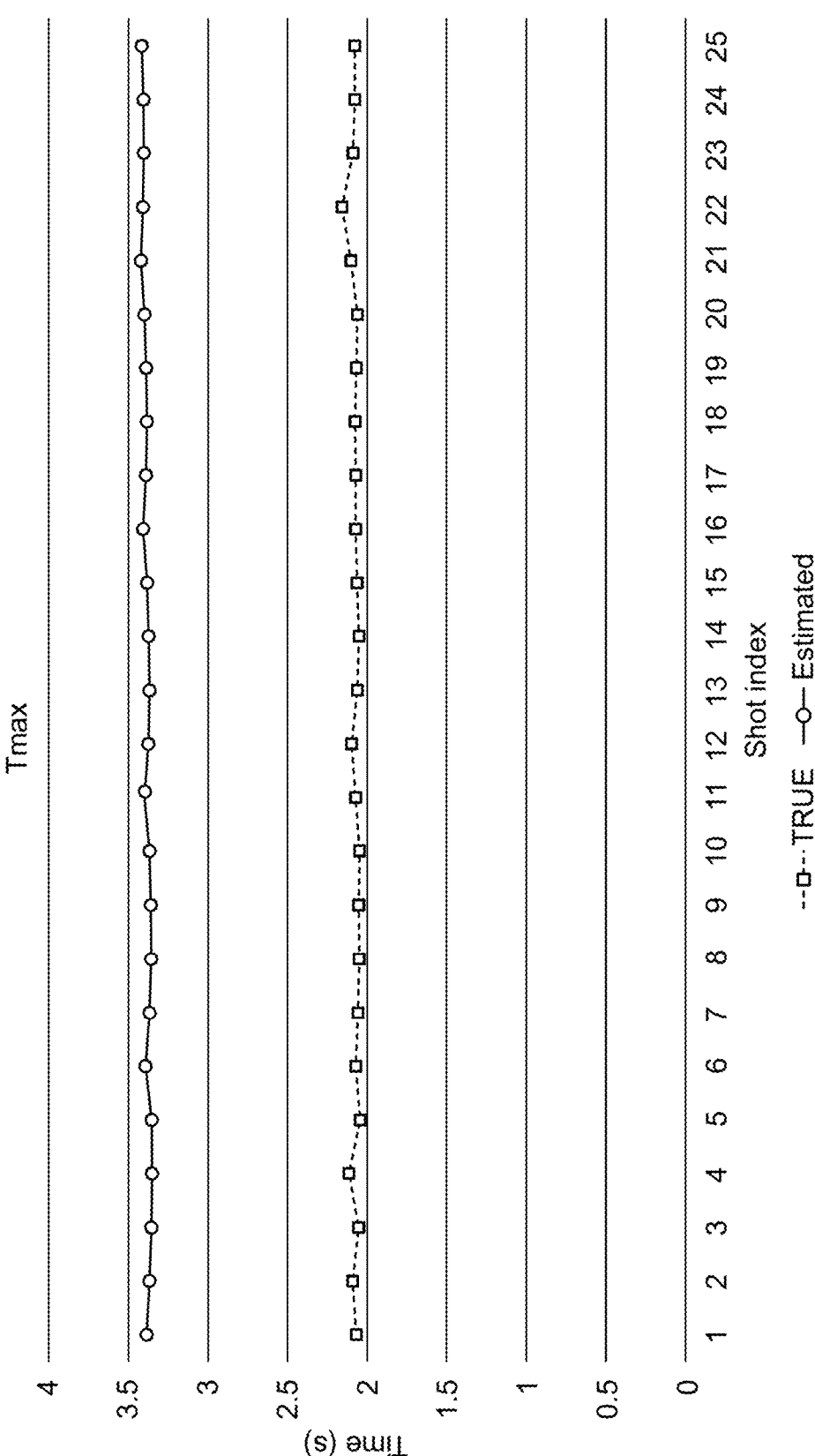
FIG. 11 compares true and estimated upper bounds of travel times for the subsurface region represented by the velocity model of FIG. 10A.

FIG. 11 compares true upper bounds (i.e., calculated using ray tracing) and estimated upper bounds (i.e., generated by the methods previously described) of travel times for the subsurface region represented by the velocity model of FIG. 8A. The chart provides a comparative analysis between the true and estimated traveltime upper bounds at various source locations that demonstrates the proposed methods' capacity to provide reasonable estimates with minimal computational overhead.

Figure 12:
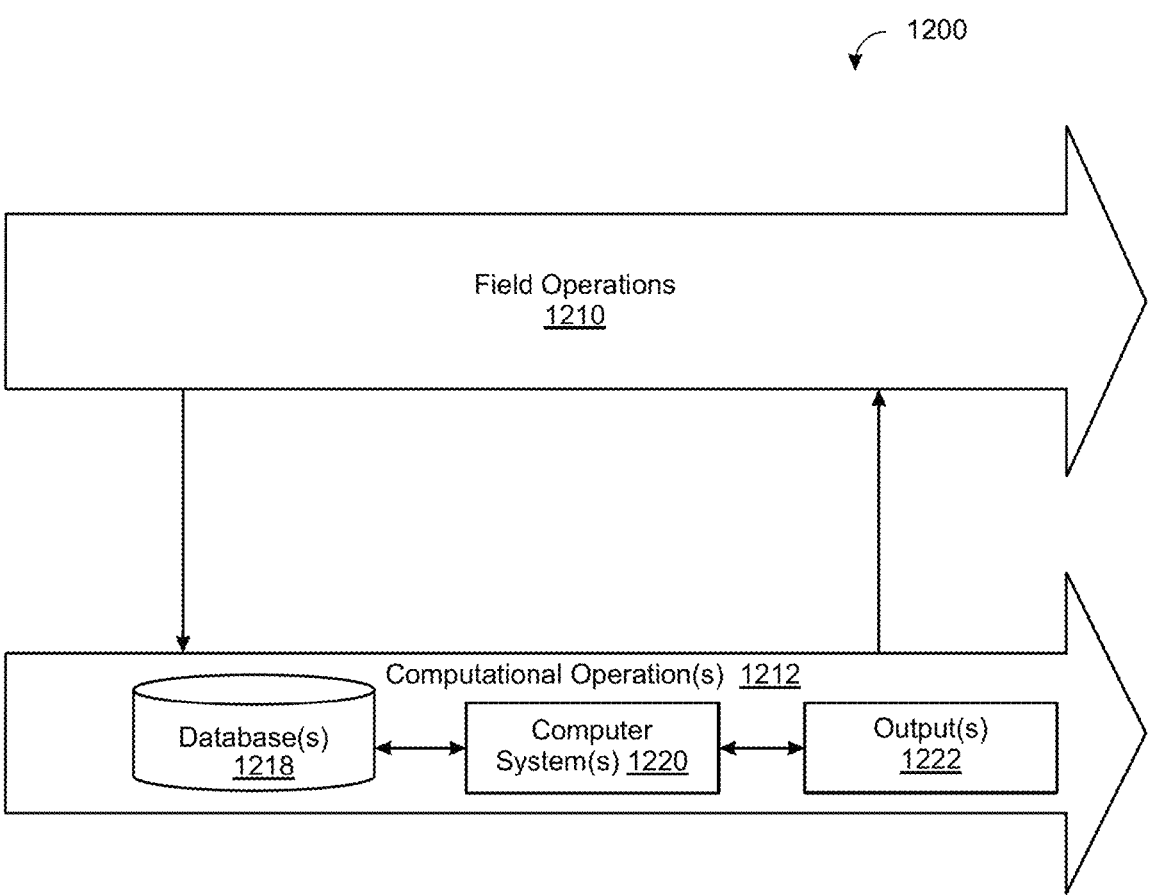
FIG. 12 illustrates hydrocarbon production operations that include both one or more field operations and one or more computational operations, which exchange information and control exploration for the production of hydrocarbons.

FIG. 12 illustrates hydrocarbon production operations 1200 that include both one or more field operations 1210 and one or more computational operations 1212, which exchange information and control exploration for the production of hydrocarbons. In some implementations, outputs of techniques of the present disclosure can be performed before, during, or in combination with the hydrocarbon production operations 1200, specifically, for example, either as field operations 1210 or computational operations 1212, or both.

Examples of field operations 1210 include forming/drilling a wellbore, hydraulic fracturing, producing through the wellbore, injecting fluids (such as water) through the wellbore, to name a few. In some implementations, methods of the present disclosure can trigger or control the field operations 1210. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 1210 and responsively triggering the field operations 1210 including, for example, generating plans and signals that provide feedback to and control physical components of the field operations 1210. Alternatively or in addition, the field operations 1210 can trigger the methods of the present disclosure. For example, implementing physical components (including, for example, hardware, such as sensors) deployed in the field operations 1210 can generate plans and signals that can be provided as input or feedback (or both) to the methods of the present disclosure.

Examples of computational operations 1212 include one or more computer systems 1220 that include one or more processors and computer-readable media (e.g., non-transitory computer-readable media) operatively coupled to the one or more processors to execute computer operations to perform the methods of the present disclosure. The computational operations 1212 can be implemented using one or more databases 1218, which store data received from the field operations 1210 and/or generated internally within the computational operations 1212 (e.g., by implementing the methods of the present disclosure) or both. For example, the one or more computer systems 1220 process inputs from the field operations 1210 to assess conditions in the physical world, the outputs of which are stored in the databases 1218. For example, seismic sensors of the field operations 1210 can be used to perform a seismic survey to map subsurface features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 1212 where they are stored in the databases 1218 and analyzed by the one or more computer systems 1220.

In some implementations, one or more outputs 1222 generated by the one or more computer systems 1220 can be provided as feedback/input to the field operations 1210 (either as direct input or stored in the databases 1218). The field operations 1210 can use the feedback/input to control physical components used to perform the field operations 1210 in the real world.

For example, the computational operations 1212 can process the seismic data to generate three-dimensional (3D) maps of the subsurface formation. The computational operations 1212 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 1212 to process new information about the formation and control the drilling to adjust to the observed conditions in real-time.

The one or more computer systems 1220 can update the 3D maps of the subsurface formation as information from one exploration well is received and the computational operations 1212 can adjust the location of the next exploration well based on the updated 3D maps. Similarly, the data received from production operations can be used by the computational operations 1212 to control components of the production operations. For example, production well and pipeline data can be analyzed to predict slugging in pipelines leading to a refinery and the computational operations 1212 can control machine operated valves upstream of the refinery to reduce the likelihood of plant disruptions that run the risk of taking the plant offline.

In some implementations of the computational operations 1212, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 13:
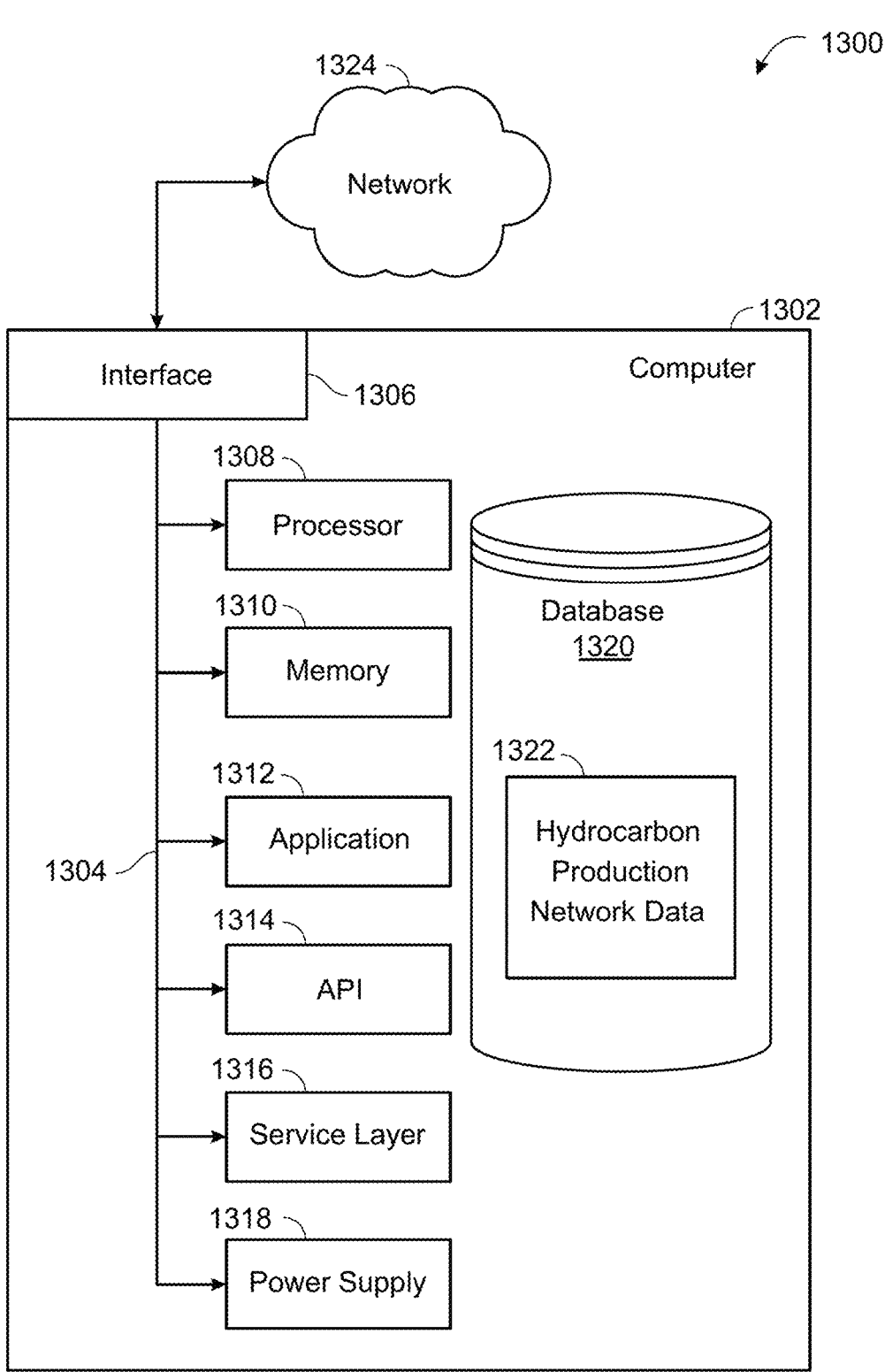
FIG. 13 is a block diagram illustrating an example computer system used to provide computational functionalities associated with described algorithms, methods, functions, processes, flows, and procedures according to some implementations of the present disclosure.

FIG. 13 is a block diagram of an example data processing system 1300 used to provide computational functionalities associated with described algorithms, methods, functions, processes, flows, and procedures described in the present disclosure. For example, the data processing system 1300 can be configured for generating seismic images. The data processing device 1302 can include input devices such as keypads, keyboards, and touch screens that can accept user information. Also, the data processing device 1302 can include output devices that can convey information associated with the operation of the data processing device 1302. The information can include digital data, visual data, audio information, or a combination of information. The information can be presented in a graphical user interface (UI) (or GUI).

The data processing device 1302 can serve in a role as a client, a network component, a server, a database, a persistency, or components of a computer system for performing the subject matter described in the present disclosure. The illustrated data processing device 1302 is communicably coupled with a network 1324. In some implementations, one or more components of the data processing device 1302 can be configured to operate within different environments, including cloud-computing-based environments, local environments, global environments, and combinations of environments.

The data processing device 1302 can receive requests over network 1324 from a client application (for example, executing on another data processing device 1302). The data processing device 1302 can respond to the received requests by processing the received requests using software applications. Requests can also be sent to the data processing device 1302 from internal users (for example, from a command console), external (or third) parties, automated applications, entities, individuals, systems, and computers.

Each of the components of the data processing device 1302 can communicate using a system bus 1304. In some implementations, any or all of the components of the data processing device 1302, including hardware or software components, can interface with each other or the interface 1306 (or a combination of both), over the system bus 1304. Interfaces can use an application programming interface (API) 1314, a service layer 1316, or a combination of the API 1314 and service layer 1316. The API 1314 can include specifications for routines, data structures, and object classes. The API 1314 can be either computer-language independent or dependent. The API 1314 can refer to a complete interface, a single function, or a set of APIs.

The service layer 1316 can provide software services to the data processing device 1302 and other components (whether illustrated or not) that are communicably coupled to the data processing device 1302. The functionality of the data processing device 1302 can be accessible for all service consumers using this service layer. Software services, such as those provided by the service layer 1316, can provide reusable, defined functionalities through a defined interface. For example, the interface can be software written in JAVA, C++, or a language providing data in extensible markup language (XML) format. While illustrated as an integrated component of the data processing device 1302, in alternative implementations, the API 1314 or the service layer 1316 can be stand-alone components in relation to other components of the data processing device 1302 and other components communicably coupled to the data processing device 1302. Moreover, any or all parts of the API 1314 or the service layer 1316 can be implemented as child or sub-modules of another software module, enterprise application, or hardware module without departing from the scope of the present disclosure.

The data processing device 1302 includes an interface 1306. Although illustrated as a single interface 1306 in FIG. 13, two or more interfaces 1306 can be used according to implementations of the data processing device 1302 and the described functionality. The interface 1306 can be used by the data processing device 1302 for communicating with other systems that are connected to the network 1324 (whether illustrated or not) in a distributed environment. Generally, the interface 1306 can include, or be implemented using, logic encoded in software or hardware (or a combination of software and hardware) operable to communicate with the network 1324. More specifically, the interface 1306 can include software supporting one or more communication protocols associated with communications. As such, the network 1324 or the interface's hardware can be operable to communicate physical signals within and outside of the illustrated data processing device 1302.

The data processing device 1302 includes a processor 1308. Although illustrated as a single processor 1308 in FIG. 13, two or more processors 1308 can be used according to implementations of the data processing device 1302 and the described functionality. Generally, the processor 1308 can execute instructions and can manipulate data to perform the operations of the data processing device 1302, including operations using algorithms, methods, functions, processes, flows, and procedures as described in the present disclosure.

The data processing device 1302 also includes a database 1320 that can hold data (such seismic data generated by a seismic survey) for the data processing device 1302 and other components connected to the network 1324 (whether illustrated or not). For example, database 1320 can be in-memory or a database storing data consistent with the present disclosure. In some implementations, database 1320 can be a combination of two or more different database types (for example, hybrid in-memory and conventional databases) according to implementations of the data processing device 1302 and the described functionality. While database 1320 is illustrated as an internal component of the data processing device 1302, in alternative implementations, database 1320 can be external to the data processing device 1302.

The data processing device 1302 also includes a memory 1310 that can hold data for the data processing device 1302 or a combination of components connected to the network 1324 (whether illustrated or not). In some implementations, memory 1310 can be a combination of two or more different types of memory (for example, a combination of semiconductor and magnetic storage) according to implementations of the data processing device 1302 and the described functionality. While memory 1310 is illustrated as an internal component of the data processing device 1302, in alternative implementations, memory 1310 can be external to the data processing device 1302.

The application 1312 can be an algorithmic software engine providing functionality according to implementations of the data processing device 1302 and the described functionality. For example, application 1312 can serve as one or more components, modules, or applications.

The data processing device 1302 can also include a power supply 1318. The power supply 1318 can include a rechargeable or non-rechargeable battery that can be configured to be either user- or non-user-replaceable.

There can be any number of computers 1302 associated with, or external to, a computer system including the data processing device 1302, with each data processing device 1302 communicating over network 1324. Further, the terms "client," "user," and other appropriate terminology can be used interchangeably, as appropriate, without departing from the scope of the present disclosure. Moreover, the present disclosure contemplates that many users can use one data processing device 1302 and one user can use multiple computers 1302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based).

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random-access memory (RAM), read only memory (ROM), phase change memory (PRAM), static random-access memory (SRAM), dynamic random-access memory (DRAM), erasable programmable read-only memory (EPROM), electrically erasable programmable read-only memory (EE-PROM), and flash memory devices. Computer readable media can also include, for example, magnetic devices such as tape, cartridges, cassettes, and internal/removable disks.

EXAMPLES

In some implementations, methods for mapping a subsurface formation, include: generating a velocity model representing the subsurface formation based on the seismic data; determining an upper bound for traveltime within the velocity model from a seismic source; and generating a seismic image of the subsurface formation by migrating the seismic data using Kirchhoff depth migration, where traveltime is calculated through ray tracing, and the maximum traveltime determines the stopping point for ray tracing. Determining an upper bound for traveltime within the velocity model from a seismic source can include: converting the velocity model into a slowness model; integrating slowness along straight paths from the seismic source to boundary points of the slowness model to generate traveltime values; and determining an upper bound of traveltime for seismic rays traveling within the velocity model by selecting a maximum traveltime value from the straight paths.

In an example implementation combinable with any other example implementation, methods also include updating the velocity model.

In an example implementation combinable with any other example implementation, updating the velocity model can include: generating estimated traveltime fields using the upper bound of traveltime for seismic rays traveling within the velocity model; generating picked traveltime fields based on the seismic data; generating a tomographic kernel based on differences between the estimated traveltime fields and the picked traveltime fields.

In an example implementation combinable with any other example implementation, velocity updates can be based on the tomographic kernel are incorporated into the velocity model.

In an example implementation combinable with any other example implementation, migrating the seismic data includes performing Kirchhoff migration on the seismic data.

In an example implementation combinable with any other example implementation, methods also include conducting a seismic survey of the subsurface formation to generate seismic data.

In an example implementation combinable with any other example implementation, methods also include performing field activities based on the seismic image of the subsurface formation. In some cases, performing field activities comprises locating and drilling a well in the subsurface formation.

A number of embodiments of the systems and methods have been described. Nevertheless, it will be understood that various modifications may be made without departing from the spirit and scope of this specification. Accordingly, other embodiments are within the scope of the following claims.

What is claimed is:

1. A method of mapping a subsurface formation, the method comprising:
   generating a velocity model representing the subsurface formation based on the seismic data;
   determining an upper bound for traveltime within the velocity model from a seismic source by:
      converting the velocity model into a slowness model;
      integrating slowness along straight paths from the seismic source to boundary points of the slowness model to generate traveltime values;
      determining an upper bound of traveltime for seismic rays traveling within the velocity model by selecting a maximum traveltime value from the straight paths; and
   generating a seismic image of the subsurface formation by migrating the seismic data using Kirchhoff depth migration, where traveltime is calculated through ray tracing, and the maximum traveltime determines the stopping point for ray tracing.

2. The method of claim 1, further comprising updating the velocity model.

3. The method of claim 2, wherein updating the velocity model comprises:
   generating estimated traveltime fields using the upper bound of traveltime for seismic rays traveling within the velocity model;
   generating picked traveltime fields based on the seismic data; and
   generating a tomographic kernel based on differences between the estimated traveltime fields and the picked traveltime fields.

4. The method of claim 3, wherein velocity updates based on the tomographic kernel are incorporated into the velocity model.

5. The method of claim 4, wherein migrating the seismic data comprises performing Kirchhoff migration on the seismic data.

6. The method of claim 5, further comprising conducting a seismic survey of the subsurface formation to generate seismic data.

7. The method of claim 6, further comprising performing field activities based on the seismic image of the subsurface formation.

\* \* \* \* \*